United States Patent [19]

Henderson

[11] Patent Number: 5,500,287
[45] Date of Patent: Mar. 19, 1996

[54] THERMAL INSULATING MATERIAL AND METHOD OF MANUFACTURING SAME

[75] Inventor: Timothy M. Henderson, Ann Arbor, Mich.

[73] Assignee: Innovation Associates, Inc., Ann Arbor, Mich.

[21] Appl. No.: 969,492

[22] Filed: Oct. 30, 1992

[51] Int. Cl.$^6$ .................................................. B32B 33/00
[52] U.S. Cl. ........................... 428/403; 428/336; 428/402; 428/406; 65/21.1; 65/21.4; 501/33; 501/34
[58] Field of Search ........................ 501/33, 34; 65/21.1, 65/21.2, 21.3, 21.4; 428/402, 403, 404, 406, 407, 336; 264/15; 427/160, 214, 215, 220, 385.5

[56] References Cited

U.S. PATENT DOCUMENTS

| | | | |
|---|---|---|---|
| 3,365,315 | 1/1968 | Beck et al. | 106/40 |
| 3,607,169 | 9/1971 | Coxe | 65/21 |
| 3,888,957 | 6/1975 | Netting | 264/13 |
| 4,016,743 | 4/1977 | Henderson et al. | 73/1 R |
| 4,028,941 | 6/1977 | Henderson et al. | 73/339 R |
| 4,029,045 | 6/1977 | Cielaszyk | 118/49 |
| 4,039,297 | 8/1977 | Takenaka | 428/566 |
| 4,257,798 | 3/1981 | Hendricks et al. | 65/21.4 |
| 4,290,847 | 9/1981 | Johnson et al. | 176/1 |
| 4,303,603 | 12/1981 | Torobin | 264/69 |
| 4,303,729 | 12/1981 | Torobin | 428/327 |
| 4,303,731 | 12/1981 | Torobin | 428/333 |
| 4,303,732 | 12/1981 | Torobin | 428/403 |
| 4,303,732 | 12/1981 | Torobin | 428/333 |
| 4,349,456 | 9/1982 | Sowman | 252/317 |
| 4,448,884 | 5/1984 | Henderson | 435/241 |
| 4,459,145 | 7/1984 | Eisholz | 65/21.3 |
| 4,547,233 | 10/1985 | Delzant | 149/2 |
| 4,548,196 | 10/1985 | Torobin | 126/443 |
| 4,582,534 | 4/1986 | Torobin | 75/229 |
| 4,610,836 | 9/1986 | Wycech | 264/313 |
| 4,618,525 | 10/1986 | Chamberlin et al. | 428/209 |
| 4,621,024 | 11/1986 | Wright | 428/404 |
| 4,624,865 | 11/1986 | Gindrup et al. | 427/126.2 |
| 4,661,407 | 4/1987 | Henderson | 428/403 |
| 4,671,909 | 6/1987 | Torobin | 264/43 |
| 4,671,994 | 6/1987 | Cochran, Jr. | 428/325 |
| 4,795,910 | 1/1989 | Henderson et al. | 250/483.1 |
| 4,867,931 | 9/1989 | Cochran, Jr. | 264/9 |
| 4,879,321 | 11/1989 | Laroche | 523/203 |

FOREIGN PATENT DOCUMENTS

| | | | |
|---|---|---|---|
| 1241571 | 9/1988 | Canada | C23C 16/40 |

OTHER PUBLICATIONS

"Microactivity Systems for Automotive Applications Final Progress Report", R. J. Teitel et al., Nov. 21, 1978.

Primary Examiner—Paul J. Thibodeau
Assistant Examiner—David Abraham
Attorney, Agent, or Firm—Basile and Hanlon

[57] ABSTRACT

Hollow microspheres produced by the present method each have a hollow interior evacuated of gases to a predetermined pressure. A reflective material layer coats the exterior of each microsphere and, optionally, an outer layer of a protective material is applied over the reflective material layer. Permeant gases are dissolved into glass or plastic frit particles prior to heating of the frit particles to form hollow microspheres having the permeant gases contained therein. The permeant gases are subsequently out-permeated in a non-permeant gas atmosphere to substantially evacuate the interior of each microsphere. The exterior layers of reflective material and protective material are then coated about each evacuated microsphere.

10 Claims, 2 Drawing Sheets

THERMAL INSULATING MATERIAL AND METHOD OF MANUFACTURING SAME

BACKGROUND OF THE INVENTION

1. Field of the Invention

The present invention relates, in general, to microspheres and, more specifically, to methods of manufacturing microspheres.

2. Description of the Art

Methods to produce hollow microspheres potentially suitable for insulation materials have been disclosed in U.S. Pat. Nos. 3,030,215; 3,161,463; 3,365,315; 3,888,957 and 4,012,290. With few exceptions, notably, U.S. Pat. No. 4,349,456, all of the current methods to produce hollow microspheres or shells rely on the use of a blowing gas, i.e., a gas which evolves within a drop of melted glass and blows the drop into a hollow glass bubble or sphere.

The input or feed particles in these processes are either drops formed from aqueous glass solutions or solid "frit" particles which become fluid upon sufficient heating. Specifically, the frit particles are generally heated to a temperature between approximately 1,000° C. to 1,800° C. In those processes using small, solid frit particles, the shells are formed by introducing the particles into a heated zone, i.e., into a furnace or torch flame, to thereby raise the particles' temperatures to the range in which the glass exhibits the properties of the liquid. Specifically, the particles are heated to the temperature range in which the viscosity of the glass is sufficiently low so that the glass flows readily, i.e., the glass viscosity is less than 500 poise and, preferably, less than 100 poise.

When a sufficiently low viscosity has been attained, the surface tension of the glass, i.e., 100 to 400 dynes/cm at the specified temperature, causes the formation of spheroidal glass drops. Within these drops, microscopically small bubbles are formed by gases which are generated by the volatilization of blowing agents which have been incorporated into the glass feed or frit particle. These smaller bubbles coalesce to form a single void within the glass drop thereby producing a glass bubble.

In the majority of commercial processes used today, the gases are generated by incorporating into the frit particles various blowing agents, i.e., materials which upon heating will evolve gases. While in the heated zone, the glass bubbles expand from the blowing gases generated by the blowing agents and from the in-permeation of ambient gases. When the bubbles exit the heated zone and are exposed to normal room temperatures, because of their small heat capacity, the bubbles rapidly solidify thereby forming solid glass shells. The internal pressure of the bubbles at the point of exiting the heated region is balanced by the forces resulting from the combination of the surface tension of the glass and the external ambient pressure. The resulting shells have diameters ranging from about 5 μm to approximately 5,000 μm. The distribution of diameters of the resulting shells depends on the production method used, the size of the feed particles, the temperature history during the blowing process, the composition of the glass, and the type of ambient gases.

In all of the current commercial shell or microsphere manufacturing processes, the shells contain residual gases. These residual gases are captured during the blowing process and, as indicated above, are a combination of gases resulting from the volatilization of the blowing agents and from the influx of ambient gases. The present invention relates to a method by which these residual gases can be removed as their presence increases the heat transfer characteristics of the hollow shells. The present method is based on the out-permeation of the residual gases into controlled environments which leads to a substantial evacuation of the shells so as to obtain the maximum possible insulation value.

A successful out-permeation of residual gases from borosilicate glass shells, type B12AX produced by the 3M Corporation, was reported by Parmley and Cunnington at "An Ultralightweight, Evacuated, Load-Bearing, High-Performance Insulation System", proceedings of the 2nd AIAA and ASME Thermophysics and Heat Transfer Conference, Palo Alto, Calif., 1978. The residual gases in these shells were determined by the authors to be 99.97% $SO_2$ and 0.03% air, at a total pressure of $2.1 \times 10^2$ Torr. According to the authors, by baking the shells in vacuum at 421° C. for twenty days, internal pressures of $\leq 0.1$ mTorr, which is the requisite pressure for good thermal insulation values, were obtained. At this pressure, the mean free path of the gas molecules is large compared to the dimensions of the shell and the conduction through the gas is linear with the pressure and becomes negligibly small. Although Parmley and Cunnington reported that baking the shells caused the $SO_2$ to permeate the walls of the sodium borosilicate glass shells, it is also possible that the $SO_2$ was caused to react with the sodium in the walls of the shells forming a low vapor pressure solid, such as $NA_2SO_4$. Alternately, due to the relatively high solubility of $SO_2$ in glass, maintaining the shells at the elevated temperatures may have caused the $SO_2$ to be re-dissolved into the walls of the shells.

Tests conducted by the inventor indicate that a reduction in $SO_2$ is indeed accomplished according to the method described by Parmley and Cunnington. However, the final pressure is approximately 6 Torr of oxygen, far from the required pressure of 0.1 mTorr, with the pressure of the oxygen remaining essentially unchanged for baking periods of approximately two months. In addition, the residual gas mixture was not that reported by Parmley and Cunnington, but was determined to be one-third oxygen and two-thirds $SO_2$. The causes for the difference in the results are unknown, but it is clear that this procedure will not provide vacuum shells with commercially available materials because of the impractically slow out-permeation of oxygen from the shells.

Torobin, in U.S. Pat. No. 4,303,732, reveals a process for manufacturing vacuum microspheres. This process is based on blowing individual shells from a molten glass using a coaxial nozzle. The blowing gas flows through the inner nozzle and the glass flows through the annulus between the two coaxial nozzles thereby forming a glass bubble, which is subsequently detached by vibration or the action of a second transverse gas stream. The vacuum is formed by entraining into the blowing gas particles of metal or metal organic compounds which will become gaseous at the molten glass temperature and which, upon cooling, will resolidify and form a reflective film on the inner surface of the microshell. The residual gas pressure at room temperature is that due to the vapor pressure of the metal. With a proper choice of metals, the film will exhibit the requisite low vapor pressure, i.e., less than 0.1 mTorr. Apparently, this process has been successfully demonstrated. However, it has also apparently proved too costly to be commercially viable.

Coxe, in U.S. Pat. No. 3,607,169, discloses a similar process. Again the production of the shell is based on the use of metals as blowing agents. In this case, glass-coated metal particles are made by an extrusion method. This process is also based on the encapsulating material being pumped through the annulus of a coaxial nozzle. As in the case of the Torbin patent, described above, this process, although apparently successfully demonstrated, has proven too costly to scale up to production levels. In general, droplet generation appears unsuitable for high volume production of evacuated microshells.

Sowman, in U.S. Pat. No. 4,349,456, discloses a process for making ceramic metal oxide shells which is not based on encapsulating blowing agents, i.e., the process does not utilize a blowing gas. This process consists of forming drops of an aqueous metal oxide colloidal sol in a dehydrating liquid, which rapidly removes the water from the drops thereby forming a gelled microcapsule. These microcapsules are recovered by filtration, dried and fired to convert them into shells. Prior to firing, the microcapsules are sufficiently porous that, if placed in a vacuum during the firing process, the gases can be removed and the resulting shells will generally be impermeable to ambient gases. However, this process is also not cost effective in scaling up to high volume production levels required for insulation because of high material costs, and the costs of purchasing and maintaining vacuum systems.

Thus, it would be desirable to provide a hollow microsphere or shell for use in thermal insulating material which has a substantially evacuated interior. It would also be desirable to provide a microsphere or shell which can be produced in quantity by a cost effective method. It would also be desirable to provide a method of manufacturing microspheres or shells having evacuated interiors with pressures less than 0.1 mTorr.

SUMMARY OF THE INVENTION

The present invention is an evacuated microsphere and method of manufacturing same.

According to the present invention, an evacuated microsphere is in the form of a hollow shell. The interior of the shell is evacuated of gas to a pressure $\leq 10^{-4}$ Torr. Optionally, a first layer of an IR reflective material is applied over the entire exterior surface of the shell. Optionally, a second outer layer of a protective material is applied over the first layer.

The microsphere is formed by a method comprising the steps of:

A. forming frit particles;

B. dissolving permeant gases into the frit particles;

C. heating the gas permeated frit particles to a predetermined temperature to blow the frit particles into hollow microspheres containing the permeant gases in the hollow interior thereof while excluding other gases from the environment which could permeate the interior of the microspheres at these elevated temperatures; and D. after reducing the temperature to a predetermined value, out-permeating the permeant gases from the microsphere in a non-permeant gas atmosphere to evacuate the interior of the microsphere to a predetermined pressure.

The method also comprises the optional step of coating the microspheres with a first exterior layer of an IR reflective material. An optional second layer of a protective material may be applied over the first reflective layer.

The out-permeating step preferably comprises the step of heating the microspheres to a temperature between about 200° C. to about 600° C. for a predetermined time period to reach a pressure of about $10^{-4}$ Torr within the interior of each microsphere.

The frit particles are formed of glass which is broken up into small diameter particles of a predetermined size distribution.

By using the present method, evacuated microspheres or shells are cost effectively produced with internal pressures $\leq 10^{-4}$ Torr. Such evacuated microspheres placed between surfaces at different temperatures reduce heat transfer between such surfaces. A bed or layer of thermal insulating material formed of such microspheres may be used to form thermal insulation for any suitable object or article.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
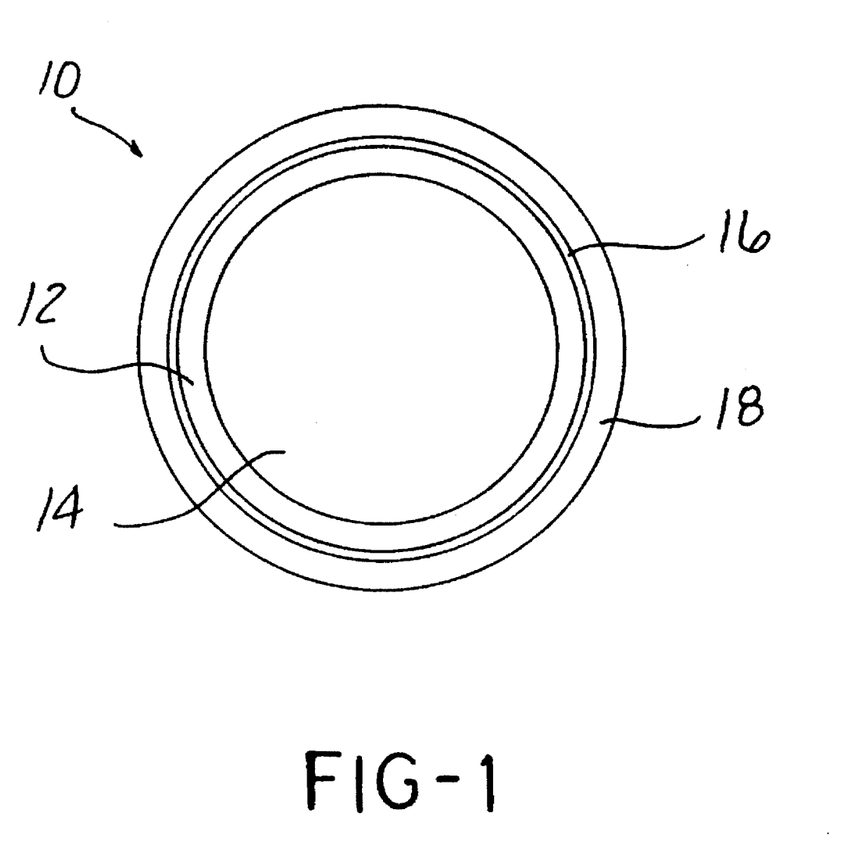
FIG. 1 is a cross sectional view of a microsphere constructed in accordance with the teachings and method of the present invention.

Referring now to the drawing, and to FIG. 1 in particular, there is illustrated an evacuated microsphere or shell 10 constructed in accordance with the teachings of the present invention.

The commercial viability of the manufacturing process of the present invention results from producing a starting material which can subsequently be processed by routine, well established methods of producing glass shells and/or the addition of a single process step to those used to produce commercially available shells. Consequently, the approach of the manufacturing process of the present invention is the use of simple, inexpensive methods to obtain a homogeneous mix of blowing agents in a glass matrix. This solid mixture of glass and blowing agents can then be processed with existing, routine methods, e.g., it can be subsequently crushed and the resulting frit particles introduced into a heated region where the particles are blown into shells.

In the present invention, the blowing agents are chosen such that the gases which they produce can be easily removed from the shells. Specifically, the blowing agents are chosen as those gases which permeate the glass shell at relatively low temperatures, such that they can be caused to out-permeate from the shells while not causing or allowing the influx of normal ambient air or other gases. Examples of these gases are water vapor (for glasses having a high solubility for water), helium, neon and hydrogen. Table 1 shows representative permeation coefficients for some of these gases and for air at various temperatures.

TABLE 1

Representative Values of Permeability for Various Silicate Gases

| | | Permeability $(cm^3 \cdot mm/sec \cdot cm^2 \cdot cm\ Hg \cdot 10^9)$ | | |
| --- | --- | --- | --- | --- |
| | Temp (C.) | Fused Quartz | Thermal Syndicate | Pyrex |
| helium | 25 | 0.05 | 0.005 | 0.04 |

TABLE 1-continued

Representative Values of Permeability for Various Silicate Gases

| | Temp (C.) | Permeability (cm$^3 \cdot$ mm/sec $\cdot$ cm$^2 \cdot$ cm Hg $\cdot 10^9$) | | |
| --- | --- | --- | --- | --- |
| | | Fused Quartz | Thermal Syndicate | Pyrex |
| neon | | $2 \times 10^{-6}$ | | |
| hydrogen | | $3 \times 10^{-5}$ | | |
| nitrogen | | $2 \times 10^{-20}$ | | |
| oxygen | | $1.0 \times 10^{-19}$ | | |
| argon | | $2.0 \times 10^{-20}$ | | |
| helium | 150 | 0.73 | | |
| | 200 | 1.39 | | 0.6 |
| | 300 | 3.15 | 0.48 | 2 |
| | 400 | 6.15 | 0.99 | 50 |
| | 500 | 10.4 | 1.72 | 80 |
| helium | 600 | 16.4 | 3 | |
| hydrogen | | 1.25 | | |
| neon | | 0.28 | | |
| helium | 700 | 21.9 | 4.25 | 5.694 |
| hydrogen | | 2.1 | | |
| neon | | 0.42 | | |
| argon | | under .000001 | | |
| oxygen | | under .000001 | | |
| nitrogen | | under .000001 | | |
| helium | 800 | 28.5 | 5.5 | |
| | 900 | 36.2 | 6.72 | |
| hydrogen | | 6.4 | | |
| neon | | 1.18 | | |
| nitrogen | | 0.95 | | |
| oxygen | | 0.0009 | | |
| argon | | 0.58 | | |
| oxygen | 950 | 0.00125 | | |
| helium | 1000 | 45.4 | 8.42 | |
| oxygen | | 0.00185 | | |
| | 1050 | 2.5 | | |
| | 1100 | 3.5 | | |

In general, the available literature on permeability shows a wide range of results by different investigators, e.g., values for helium through silica by these inventors vary by as much as two orders of magnitude. It should also be noted that small changes in the amount of non-glass formers can produce significant changes in permeability.

The permeation coefficient, K, is defined on the basis of a one-dimensional equation (1), describing the rate of permeation of a gas (dQ/dt), per unit area A, through a wall of thickness w for a concentration gradient dC/dx:

$$dQ/dt = k \, A \, dC/dx \quad (1)$$

The permeation coefficients in Table 1 were constructed from empirical formulas and data primarily from the "*Handbook of Glass Data*, C. V. Mazwrin, Elsevien (1989) and data available from "Glass Science", R. H. Doremus, John Wiley & Sons, New York (1973) and "*The Scientific Foundations for VAcuum Technology*", S. Dushman, 2nd Edition, John Wiley and Sons, New York, (1962).

The time it takes (t) to attain an internal pressure (p) within the shells by out-permeating the gases is given by ("*Microactivity Systems for Automotive Applications*", Final Progress Report, R. J. Teitel et al., RJTA Report No. 780001006U-R2 (1978).

$$t = (dw)/(6kRT) ln(p_0/p) \text{ where} \quad (2)$$

d=the diameter of the shell
w=the wall thickness
k=the permeation coefficient
R=the universal gas constant
T=the temperature of the shell in deg K
$P_0$=the initial residual gas pressure within the shell The time required to "fill" a shell to a pressure p is given by $$t = (dw)/(6kRT) ln(P_{ext}/P_{ext}-p) \text{ where} \quad (3)$$

$P_{ext}$ is the pressure of the permeating gas external to the shell.

From equation 2, the dependence of the time required to "empty" the shells on the temperature of the shells is apparent. In addition, the parameter k, the permeation coefficient, is itself temperature dependent. This dependence takes the form, $$k = A(B+CM^3)T exp-(a+bM)/T \text{ where} \quad (4)$$

A, B, C, a and b are all empirically derived constants that are dependent on the permeant gas and M is the mole percentage of non-network forming glass constituents.

For all cases, the bM/T term dominates the contribution to k made by M. Consequently, to obtain rapid out-permeation, the percentage of non-network formers should be kept to a minimum, e.g., for silicate based glasses, pure silica is most permeable (or pure silica with other network formers such as boron oxide).

TABLE 2

Representative Times for Gases Leaving and Entering Microspheres
Microsphere OD = 100 μm, wall 1μm
(Permeability in cm$^3 \cdot$ mm/sec $\cdot$ cm$^2 \cdot$ cm Hg $\cdot$ 1.0 + 10$^9$)

| Material/Permeant | Temperature (C.) | Permeability | Time |
| --- | --- | --- | --- |
| Helium and Oxygen, from 1 atm (760 Torr) to 0.1 mT | | | |
| Fused Quartz/He | 150 | 0.73 | 30.74 seconds |
| Boro Silicate/He | 300 | 0.7 | 23.67 seconds |
| Fused Quartz/He | 25 | 0.05 | 10.62 minutes |
| Boro Silicate/He | 25 | 0.003 | 2.95 hours |
| Fused Quartz/O$_2$ | 900 | 0.0009 | 2.50 hours |
| Fused Quartz/O$_2$ | 700 | 0.000001 | 112.92 days |
| Filling Times of Helium and Oxygen as Found in the Atmospheric Gases | | | |
| Boro Silicate/He | 25 | 0.003 | 3.21 minutes |
| Fused Quartz/O$_2$ | 25 | $1.0 \times 10^{-10}$ | 186 years |
| Alumino Silicate/He | 25 | 0.0000003 | 22.31 days |

As an example, table 2 shows the rate at which the internal pressure of the shells changes at various temperatures as a result of the in-permeation or out-permeation of helium from silica and oxygen. These rates result from the above analysis and investigations specific to hollow microspheres attributable to the inventor.

From Table 2 it is apparent that fused quartz is not suitable as a material for an insulating shell by virtue of its high permeability to helium at room temperature. In addition, Table 2 shows that the out-permeation of air from shells is impractical in that all but silica glass shells will take more than three months. This is due to the fact that other glasses have softening temperature of the order of 600° C.–800° C., so that out-permeations at higher temperature is not possible. Filling times for boro silicates and alumino silicates were estimated using equation (4). The inventor's experience indicates that these times are underestimated from the literature by several orders of magnitude. For example, sodium boro silicate shells (≈100 μm OD-1 μm wall) were filled with helium to a pressure of 100 atm and measured after 14 months. The decrease in pressure was less than 1 atm. With alumino silicate shells produced by KMS Fusion, Inc., Ann Arbor, Mich., again, no helium losses were measurable after 1 year.

In some instances, e.g. with high helium ambient pressures, or with high temperature applications, it may be necessary to further decrease the in-permeation of helium. It is part of this invention to choose the reflective layer such that it is a permeation barrier to helium. This material will generally be a metal, since helium does not permeate metals.

Although the microspheres or shells 10 may be formed of suitable materials, such as plastic, as described in greater detail hereafter, preferably, the microspheres 10 are formed of glass. The preferred glasses for use in forming the microspheres 10 belong to the class referred to as soda-lime-silicate glasses, e.g., Corning Glass No. 0080 which has an approximate composition (wt %) of 72.6 $SiO_2$, 0.8 $B_2O_3$, 1.7 $Al_2O_3$, 4.6 CaO, 3.6 MgO, and 15.2 $Na_2O$. Borosilicate or sodium borosilicate may also be employed to form the glass.

Figure 2:
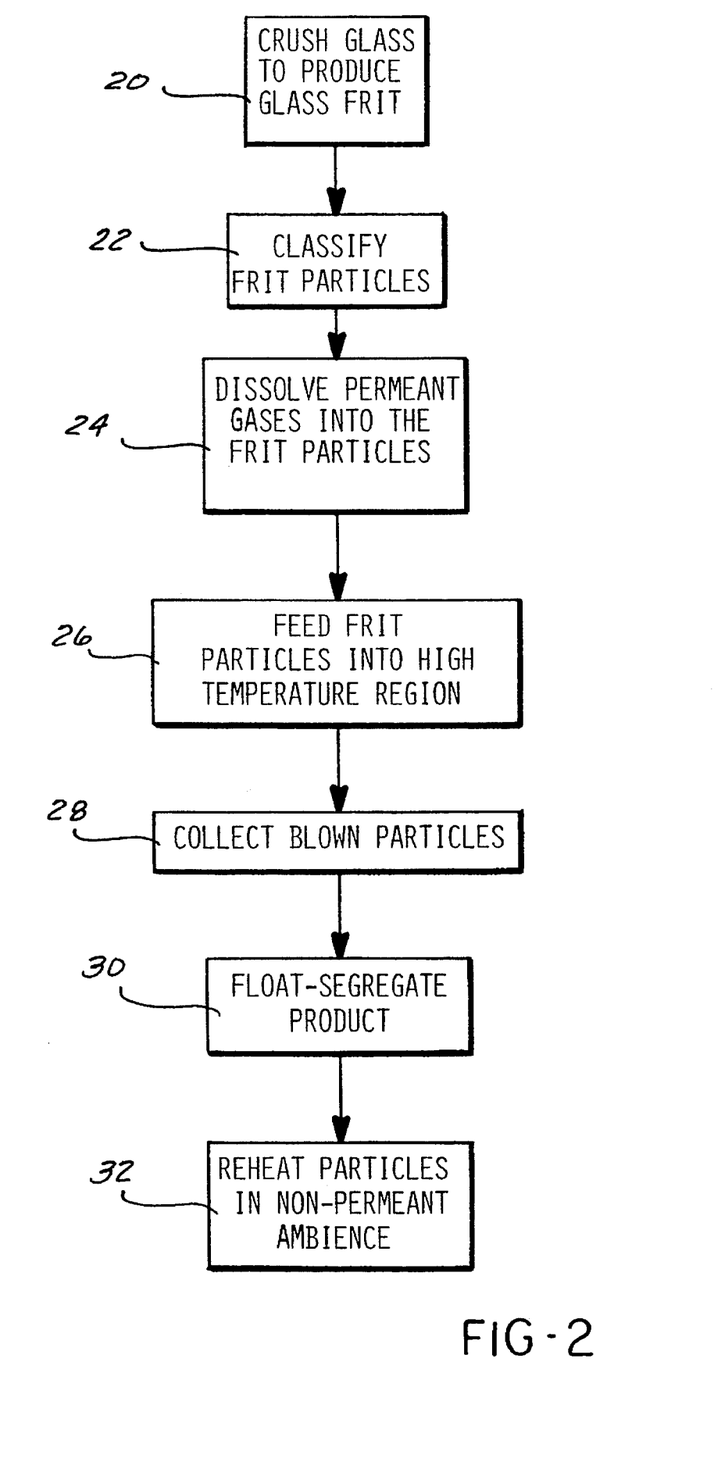
FIG. 2 is a flow chart showing the steps of the method of manufacturing an evacuated microsphere according to the present invention.

As shown in FIG. 2, according to the first step 20 in the method of the present invention, glass as described above is crushed to produce numerous glass frit particles which are used as feed particles from which the microspheres or shells 10 will be blown. Any of many suitable commercially available crushing apparatus, e.g. ball mills, may be employed to produce glass frit particles of a predetermined diameter or size distribution.

The next step 22 in the method of the present invention is optional and involves the classification by diameter of the frit particles. This is required only in those applications in which maintaining a narrow distribution of size of the shells 10 is important. The classification may be performed by any suitable means, such as a series of screening surfaces, such as sieve sets. The mean feed particle dimension, D, is related to the desired shell dimensions by the equation $D=1.8(d^2w)^{1/3}$.

In the third step 24 of the method of the present invention, the frit particles are exposed to an ambient environment containing gases which have a high or relatively high solubility for the glass of which the frit particles are composed. Such gases are selected from the group consisting of water vapor, helium, hydrogen, neon, and combinations of water vapor and the other permeant gases. The rate of diffusion of such gases generally increases as the size or molecular weight of the permeating gases decreases. For example, helium and hydrogen readily permeate the glass shells 10, while neon permeates more slowly. Oxygen and nitrogen permeate much more slowly and gases, such as $CO_2$, permeate, at even the maximum practical temperatures, at a negligible rate.

For soda-lime-silicate glasses, representative temperature and exposure times for dilution of the above-described blowing glasses into the frit particles at 100% RH are thirty minutes at 400° C., twenty minutes at 550° C. and fifteen minutes at 650° C.

Next, as shown by step 26 in FIG. 2, the frit particles containing permeant blowing gases therein are heated by being fed, for example, into a heated region which they traverse vertically under the influence of gravity and drag forces. The heated region may be a furnace in which the gases can be relatively motionless or may be updrafts or downdrafts, which can be used to extend or decrease the residence time of the frit particles in the heated zone. An essential part of this step 26 of the present method requires that all gases that cannot be made to readily permeate the shells 10 after the shell formation must be excluded from the heated region. This is accomplished by various means, including, for example, avoiding the introduction of the frit particles into an air-flame torch which would cause the retention of $CO_2$ by the shells 10 and by replacing the usual ambient air with permeant gases, such as helium, neon, hydrogen, water vapor and mixtures of such gases with water vapor. Examples of such heated regions used to blow the frit particles into hollow shells 10 include resistively heated furnaces, an air-torch heating external to and excluded from the heated region, radiant heating by light sources, and microwave heating of the enclosure through which the frit particles pass.

The present method replaces the conventional vacuum evacuation with an ambient environment of gaseous helium or similar permeant gases described above. This process replaces expensive vacuum equipment and the accompanying expensive equipment maintenance with a simple flowing helium or other permeant gas stream. Such gases rapidly permeate the shells 10 and thus can be removed from the shells after the residual gases have been out-permeated. This removal can be accomplished at low temperatures as described hereafter.

During such heating, the permeant gases in the frit particles expand and blow the frit particles which have been heated to a fluid state at a temperature between approximately 1,000° C. to 1,800° C. The microsphere 10 thus includes an outer spherical shell 12 surrounding an interior cavity 14 containing residual permeant gases therein.

The fifth step 28 in the present method involves the collection of the shells 10 after they have traversed the heated region. Such collection can be accomplished either dry, or in cold water, or in any other relatively non-volatile liquid. Cold water collection, step 28, is preferred since the next step 30 in the present method is immediately taken to separate the blown shells from any unblown material.

As shown in FIG. 1, the blown microspheres 10 having the spherical outer shell 12 and the interior cavity 14 generally have a high aspect ratio, i.e., AR≧80 which will provide a high insulating value. However, applications requiring insulation containing the evacuated microspheres 10 to bear high loads may require smaller aspect ratios, i.e., thicker walls for the same diameter, at the expense of decreasing the thermal resistance.

Next, the residual gases contained in the interior 14 of the shell 12 are out-permeated in normal air ambience to evacuate the interior 14 to a predetermined pressure, such as approximately $\geq 10^{-4}$ Torr. It has been found that this pressure creates an evacuated microsphere 10 having high thermal insulative properties as shown in Table 3. Depending upon the insulation requirements of a particular application, different internal pressures may also be employed, higher than the above-specified internal pressure.

TABLE 3

| | R-VALUES | |
|---|---|---|
| Material | Thermal Conductivity (BTU/hr ft F.) | R Value (hrs for 1 BTU to be transferred through an area of 1 ft² and a thickness of 1 inch) |
| 1 Uncoated plastic shells @ 1 atm | 0.033 | 3 |
| 2 Uncoated glass shells @ 1 atm | 0.035 | 2 |
| 3 Coated plastic shells @ 1 atm | 0.032 | 3 |

TABLE 3-continued

R-VALUES

| Material | Thermal Conductivity (BTU/hr ft F.) | R Value (hrs for 1 BTU to be transferred through an area of 1 ft² and a thickness of 1 inch) |
| --- | --- | --- |
| 4 Coated glass shells @ 1 atm | 0.034 | 2 |
| 5 Uncoated plastic shells @ 0.1 mT | 0.00056 | 149 |
| 6 Uncoated glass shells @ 0.1 mT | 0.000633 | 132 |
| 7 Coated plastic shells @ 0.1 mT | 0.000022 | 3788 |
| 8 Coated glass shells @ 0.1 mT | 0.0000974 | 856 |
| 9 Asbestos | 0.087 | 1 |
| 10 Glass Wool | 0.016 | 5 |
| 11 Rock Wool | 0.017 | 5 |
| 12 Kaolin Firebrick | 0.05 | 2 |
| 13 Silica Aerogel @ 1 atm | 0.0113 | 7 |
| 14 Silica Aerogel @ 0.1 mT | 0.0012 | 69 |
| 15 Perlite @ 0.1 mT | 0.0006 | 139 |
| 16 Diatomaceous earth @ 0.1 mT | 0.0008 | 104 |
| 17 Calcium Silicate @ 0.1 mT & 0.2 µm | 0.0004 | 208 |
| 18 Polystyrene foam @ 1 atm | 0.019 | 4 |
| 19 Polystyrene foam @ 0.01 mT | 0.0047 | 18 |
| 20 Multilayer insulation | 0.00002 | 4167 |

In order to out-permeate the residual gases in the interior cavity 14 of the shells 12, the shells 12 are heated to a temperature between 200° C. and approximately 250° C. for a predetermined time, e.g., three hours. Due to the rapid permeability of the gases and water vapor described above, such gases and/or water vapor readily out-permeate from the interior cavity 14 of the shell 12. Such out-permeating or heating step is undertaken in an environment in which gases which would readily permeate the shells 10 at this temperature are absent or excluded. Thus, the heating of the blown particles can take place in an atmosphere devoid of helium, neon, etc., and most practically can be performed in dry air. The high permeability rates of such gases and water vapor as compared to the substantially lower permeability rates of carbon dioxide, oxygen, nitrogen and other materials will cause such gases to out-permeate from the shells 12 before any amount of other gases can permeate into the shells 12.

Radiant heat transfer between a plurality of evacuated microspheres 10 arranged in a bed or tightly packed mass may be further inhibited or reduced by coating each microsphere 10 with a coating of a highly IR reflective material about the entire exterior surface of each microsphere 10. The first reflective layer or coating 16 is preferably formed of a metal, such as aluminum, silver, copper, gold, nickel, chromium, zinc, tin, and alloys, such as Nichrome, with a thickness in the range of 30 nm to 50 nm and desired emissivities in the infrared range of ≦0.04.

Such a material, typically a metal, may be added by a variety of techniques, including vacuum evaporation, sputter deposition, vacuum arc deposition, chemical vapor deposition, electrolytic plating and electroless plating. Because of their physical properties, such as vapor pressure as a function of temperature, low electrical conductivity, etc., some of the material may be limited to deposition by a smaller set of these techniques, e.g., glass and polymers may be limited to sputter deposition and chemical vapor deposition.

For techniques other than wet chemical techniques, the shells must be rotated so as to have a continuous coating over their entire surfaces. An example of a suitable technique is randomly vibrating the shells is described in U.S. Pat. No. 4,029,045. In this process the shells are passed below the source of the coating material, for example a sputter target, and vibrated ("bounced") into the region above the conveyor system. As a consequence of being bounced into the deposition region, the shells randomly rotate and thereby expose all sides to the coating source. This coating source can also be a vacuum evaporation source or a vacuum arc deposition source.

Shell coating using chemical vapor deposition can be performed as taught by the present inventor in U.S. Pat. Nos. 4,448,884 and 4,564,532, the contents of each of which are incorporated herein by reference. This procedure has been successfully used to coat both glass and polymeric shells. The technique is suitable for processing large quantities of materials and is limited in its cost effectiveness only by the cost of the process materials.

As discussed above, the use of high vacuum processing is generally to be avoided because vacuum processing is potentially expensive. Nevertheless, for high value added coatings, vacuum techniques have been successfully incorporated into high volume plating processes, e.g., sputter deposition of chrome coatings on plastic automotive components and bumpers. Applications of the present invention, which potentially require high-value added coatings such as silver, gold or platinum can be approached using such vacuum techniques. Space and cryogenic applications in many instances will justify the use of vacuum coating processes.

Both electroless and electrolytic coatings have been successfully employed to coat shells with nickel and gold. Both of these techniques potentially may prove to be the most cost effective procedures for coating shells.

Electroless nickel coating of glass shells comprises the following steps:

1) de-glaze the surface of the shells via a mild chemical etching, e.g., 10 NaOH at 60° C. for ten minutes;

2) prepare a pre-plating solution consisting of Enplate PC-452 (from Entone, Inc,) at 240 g/l, maintained at 80° C.;

3) insert the shells into a shallow vessel in which the pre-plating solution can be continuously stirred and agitated (as an alternative to this, the vessel may consist of a collection of roller bottles) for three to five minutes;

4) cold water rinse shells;

5) insert shells into Enplate AD-480 at 60 g/l at room temperature for ten seconds;

6) cold water rinse;

7) insert shells into Enplate sensitizer 432, at 60 ml per 900 ml $H_2O$;

8) cold water rinse shells twice;

9) insert shells into Enplate Activator 440, at 30 ml per 900 ml of $H_2O$ at room temperature for thirty seconds;

10) cold water rinse;

11) insert shells into Enplate NI 410 plating solution consisting of a 1:2 ratio to distilled water, at 90° C. for two minutes;

12) cold water rinse the shells; and 13) air dry.

The above process can be used to copper coat glass shells by substituting Enplate Cu-402A and Cu-402B for NI 410 in step 11 at 4 parts of Cu-402A and 4 parts of Cu-402B to 3 parts water.

Electrolytic plating offers the opportunity to coat the shells with more than 25 different metals, but is hampered by the fact that the shells are not configured as an electrode. This difficulty has been resolved by A. Mayer and D. Catlett of Los Alamos National Laboratory and repeated by the inventor using a system composed of a hollow cylindrical plating column whose bases are covered with nylon mesh screens. The plating column wall is a porous alumina ceramic tube. The plating chamber cavity, in addition to the particles to be coated, is approximately half filled with loose packed glass beads. The porous alumina column wall is saturated with the electrolyte and the anodes are placed concentrically about the chamber. The cathode wires are mounted adjacent to the screen bases on the inside of the column. The shells are then caused to alternately pack against one screen and then the other by pumping fluid through the cell, first in one direction and then in the opposite direction. When the shells are in contact with the screens, the plating voltage is applied between that screen and the anode and plating occurs. To prevent the shells from sticking and agglomerating, the shells are then caused to move to the screen at the opposite end of the chamber by reversing the flow of the electrolyte. Plating commences once again at the new "cathode".

Preparation of the shells and beads prior to plating consists of float separation in absolute methanol, alkaline cleaning, and activating in an acid media. The plating rate is ultimately a function of the electrolyte type and the applied plating parameters. For a typical batch of 25,000 to 100,000 shells, a 1 μm plating thickness is achievable in plating times of five to thirty minutes.

Finally, for certain applications in which the microspheres 10 coated with a first IR reflective material layer 16 are subject to high loads, an outer or second protective layer 18 of a suitable hard, protective, low thermal conductivity material may be formed or coated about each microsphere 10. The protective material may be glass, plastic or other inorganic compounds which are not absorbing the infrared range. Such coating or layer 18 may have a thickness of about 50 nm.

If plastic material is used to form the frit particles, the first IR reflective layer coating 16 and possibly the second or outer protective layer coating 18 must be applied in a vacuum immediately after such blown particles are formed so as to prevent the in-permeation of gases into the interior of the blown microspheres 10. The outer protective layer 18 limits heat conduction through the microspheres 10 at the contact points therebetween and adds an additional thermal insulative layer between the microspheres 10.

The thus formed microspheres 10 coated with the first or first and second material layers may be employed in a variety of applications to provide a range of thermal insulative characteristics. For example, a large number of microspheres 10 may be formed in a bed and the interstices between each microsphere 10 evacuated. Such an application may be a vacuum sealed container. The outer protective layer 18 of each microsphere 10 may be fuse coated with other coated microspheres 10 or with a binder or with uncoated microspheres 10 before the interstices are evacuated. It is also possible to fill the interstices between each microsphere 10 with ambient gases or with low thermal conductivity gases, such as helium, hydrogen, nitrogen, neon, etc. It is also feasible to segregate the IR reflective coated microspheres 10 from uncoated microspheres 10 to form an IR reflective layer internally or externally to the uncoated evacuated microspheres 10. Other applications include the random mixing of IR reflective material coated microspheres 10 with uncoated microspheres, as well as the introduction of evacuated coated or uncoated microspheres in other media, i.e., foams, rubber, plastics, glass, other insulating materials, paints and roofing materials, to improve the thermal insulating values of such media.

In summary, there has been disclosed a thermal insulating material formed of evacuated microspheres and a method of manufacturing the same which is cost effective in producing such evacuated microspheres. The microspheres have a low thermal conductivity to act as thermal insulation in a variety of applications. The evacuated microspheres according to the present method are formed using conventional techniques and replace the expensive vacuum techniques employed with previously devised evacuated microspheres to obtain the desirable low thermal conductivity characteristics by evacuating the interior of each microsphere of residual gases.

What is claimed is:

1. An evacuated microsphere comprising:

a shell surrounding a hollow interior, the shell having a single exterior surface;

the interior of the shell being evacuated of substantially all gases to a pressure $<10^{-4}$ Torr at any temperature;

a first layer of an IR reflective material applied over the exterior surface of the shell having a thickness of 30 to 50 nanometers for an emittance in the infrared range of $<0.04$; and a second outer layer of a protective material applied over the first layer:

at least one of the first and second layers having a permeation constant of less than $1\times10^{-19}$ $cm^3 \cdot mm/sec \cdot cm^2 \cdot cmHg$ at 25° C. with respect to oxygen to form a permeation barrier to the influx of oxygen through the shell;

the evacuated microsphere produced by the method including the steps of:

forming particles;

dissolving permeant gases into the particles;

heating the gas permeated particles to blow each particle into a shell having a hollow interior containing only the permeant gases in the hollow interior while excluding gases from outside of the shell which cannot be readily out permeated from the hollow interior of the shell at temperatures lower than about 200° C.;

out-permeating the permeant gases from the hollow interior of the shell in a gas atmosphere composed of gases having permeabilities lower than that of the permeant gases within the shell to evacuate the interior of the shell to a pressure of $\leq 10^{-4}$ Torr and to thereby remove substantially all of the gases from the shell at any temperature;

coating the shells with a first exterior layer of an IR reflective material having a thickness of 30 to 50 nanometers for an emittance in the infrared range of $\leq 0.04$;

coating the IR reflective material layer with a second outer protective material layer; and selecting at least one of the first and second layers having a permeation constant of less than $1\times10^{-19}$ $cm^3 \cdot mm/sec \cdot cm^2 \cdot cmHg$ at 25° C. with respect to oxygen to form a permeation barrier to the influx of oxygen through the shell.

2. The evacuated microsphere of claim 1 wherein the step of coating the shells with an IR reflective material layer comprises the step of:

selecting the IR reflective material from the group consisting of aluminum, silver, copper, gold, nickel, chromium, zinc, and tin.

3. The evacuated microsphere of claim 1 wherein the particles are selected from the group consisting of glass and polymers.

4. The evacuated microsphere of claim 3 wherein the step of forming the particles further comprises the step of breaking glass into fine particles of a predetermined size distribution.

5. The evacuated microsphere of claim 1 wherein the step of out-permeating further comprises the step of:

heating the shells to a temperature between about 200° C. and about 250° C. for a predetermined time to reach a pressure of $\leq 10^{-4}$ Torr within the interior of each shell.

6. The evacuated microsphere of claim 1 wherein the step of coating the IR reflective material layer further comprises the step of:

coating the IR reflective material with the second outer protective material layer in a thickness of about 50 nm.

7. An evacuated microsphere comprising:

a shell surrounding a hollow interior, the shell having a single exterior surface;

the interior of the shell being evacuated of substantially all gases to a pressure $\leq 10^{-4}$ Torr at any temperature;

a first layer of an IR reflective material applied over the exterior surface of the shell having a thickness of 30 to 50 nanometers for an emittance in the infrared range of $\leq 0.04$; and a second outer layer of a protective material applied over the first layer;

at least one of the first and second layers having a permeation constant of less than $1 \times 10^{-19}$ cm$^3$·mm/sec·cm$^2$·cmHg at 25° C. with respect to oxygen to form a permeation barrier to the influx of oxygen through the shell.

8. The evacuated microsphere of claim 7 wherein the IR reflective material is selected from the group consisting of aluminum, silver, copper, gold, nickel, chromium, zinc, and tin.

9. The evacuated microsphere of claim 7 wherein the shell is formed of particles selected from the group consisting of glass and polymers.

10. The evacuated microsphere of claim 7 wherein:

the second outer layer has a thickness of about 50 nm.

* * * * *

UNITED STATES PATENT AND TRADEMARK OFFICE
CERTIFICATE OF CORRECTION

PATENT NO. : 5,500,287
DATED : March 19, 1996
INVENTOR(S) : Timothy M. Henderson It is certified that error appears in the above-indentified patent and that said Letters Patent is hereby corrected as shown below:

Column 12,
Claim 1, line 28, delete "$<10^{-4}$ Torr" and insert --$\leq 10^{-4}$ Torr--.

Claim 1, line 32, delete "$<0.04$" and insert --$\leq 0.04$--.

Signed and Sealed this

Sixteenth Day of July, 1996

*Attest:*

BRUCE LEHMAN

*Attesting Officer*     *Commissioner of Patents and Trademarks*